(12) United States Patent
Glover (10) Patent No.: US 12,115,930 B1
(45) Date of Patent: Oct. 15, 2024

(54) STEALTHY TRANSMISSION SHIFT INTERLOCK SOLENOID KILL SWITCH SYSTEM AND ASSOCIATED METHOD(S)

(71) Applicant: Darrell F. Glover, Jacksonville, FL (US)

(72) Inventor: Darrell F. Glover, Jacksonville, FL (US)

(*) Notice: Subject to any disclaimer, the term of this patent is extended or adjusted under 35 U.S.C. 154(b) by 0 days.

(21) Appl. No.: 18/450,987

(22) Filed: Aug. 16, 2023

Related U.S. Application Data (60) Provisional application No. 63/499,269, filed on May 1, 2023.

(51) Int. Cl.
| | |
|---|---|
| *B60R 25/06* | (2006.01) |
| *B60R 25/00* | (2013.01) |
| *B60R 25/21* | (2013.01) |
| *F16H 59/08* | (2006.01) |
| *F16H 61/22* | (2006.01) |
| *F16H 59/02* | (2006.01) |

(52) U.S. Cl.
CPC .......... *B60R 25/007* (2013.01); *B60R 25/066* (2013.01); *B60R 25/21* (2013.01); *F16H 59/08* (2013.01); *F16H 61/22* (2013.01); *F16H 2059/0282* (2013.01); *F16H 2061/223* (2013.01); *Y10T 74/20085* (2015.01)

(58) Field of Classification Search
CPC ..... B60R 25/00; B60R 25/002; B60R 25/003; B60R 25/007; B60R 25/06; B60R 25/066; B60R 25/21; F16H 59/08; F16H 59/10; F16H 59/0204; F16H 61/22; F16H 2061/223; F16H 2059/081; F16H 2059/0282; Y10T 74/20085

USPC .......... 180/287; 70/202, 237, 245, 247, 248, 70/254; 74/473.21, 473.23, 473.24; 307/10.2; 320/426.11, 426.12, 456
See application file for complete search history.

(56) References Cited

U.S. PATENT DOCUMENTS

| | | | |
|---|---|---|---|
| 5,791,175 A * | 8/1998 | Van Wyk | B60R 25/066 70/237 |
| 9,132,805 B1 * | 9/2015 | King | B60R 25/23 |
| 2004/0041689 A1 * | 3/2004 | DeBono | B60R 25/066 340/5.52 |

FOREIGN PATENT DOCUMENTS

| | | | |
|---|---|---|---|
| JP | H07257324 A | * | 10/1995 |
| KR | 19980055098 A | * | 9/1998 |

* cited by examiner

*Primary Examiner* — Keith J Frisby
(74) *Attorney, Agent, or Firm* — Ashkan Najafi (57) ABSTRACT

A stealthy transmission shift interlock solenoid kill switch system includes a first stealthy user interface being located within the vehicle and further being configured to be stealthy and hidden from a vehicle driver's line of sight, a vehicle center console transmission gear shift knob configured to operate an automatic transmission gear position of the vehicle, a vehicle power interrupt feature, an automatic transmission shift interlock solenoid switch, a controller being operably coupled to the first stealthy user interface, a brake pedal of the vehicle, and the vehicle power interrupt feature. The controller is configured to manage an operating mode of the vehicle center console transmission gear shift knob and thereby prohibit power from reaching the automatic transmission shift interlock solenoid switch so that the vehicle center console transmission gear shift knob is prohibited from being displaced out of a park position.

14 Claims, 6 Drawing Sheets

STEALTHY TRANSMISSION SHIFT INTERLOCK SOLENOID KILL SWITCH SYSTEM AND ASSOCIATED METHOD(S)

CROSS REFERENCE TO RELATED APPLICATIONS

This is a non-provisional patent application that claims priority to and benefit of U.S. provisional patent application No. 63/499,269 filed May 1, 2023, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to vehicle security systems and, more particularly, to a specially configured stealthy transmission shift interlock solenoid kill switch system for selectively prohibiting an unauthorized user from displacing a center console transmission gear shift knob from a park position to another gear position (e.g., neutral, drive, reverse) after the vehicle engine is started and running.

Prior Art

Conventional automatic vehicle transmissions include a shifter or shift lever for selecting one of seven different operating positions. These operating positions are commonly referred to as the park, reverse, neutral, drive, second, and first positions. An overdrive position is also provided for some transmissions. A brake transmission shift interlock feature is designed to prohibit movement of the shift lever from the park position unless the ignition switch is disposed in the run position and the brake pedal is depressed. With the ignition switch disposed in the run position, this feature is disabled when the brake pedal is sufficiently depressed to activate the brake light switch. When this feature is disabled, the shift lever may be removed from the park position.

Unfortunately, such a feature does not prevent an unauthorized user from stealing a vehicle while the vehicle is running. Prior art attempts to prevent unauthorized gear displacement from a park position only disable the vehicle's power from the battery or disable fuel to the engine.

Accordingly, a need remains for a specially configured stealthy transmission shift interlock solenoid kill switch system in order to overcome at least one of the above-noted shortcomings. The exemplary embodiment(s) satisfy such a need by a specially configured stealthy transmission shift interlock solenoid kill switch system that is convenient and easy to use, lightweight yet durable in design, versatile in its applications, and configured for prohibiting an unauthorized user from displacing a center console transmission gear shift knob from a park position to another gear position (e.g., neutral, drive, reverse) after the vehicle engine is started and running.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured stealthy transmission shift interlock solenoid kill switch system for selectively prohibiting an unauthorized user from displacing a center console transmission gear shift knob from a park position to another gear position (e.g., neutral, drive, reverse) after the vehicle engine is started and running. These and other objects, features, and advantages of the non-limiting exemplary embodiment(s) are provided by a stealthy transmission shift interlock solenoid kill switch system that includes a first stealthy user interface being located within the vehicle and further being configured to be stealthy and hidden from a vehicle driver's line of sight, a vehicle center console transmission gear shift knob being located in the vehicle and being configured to operate an automatic transmission gear position of the vehicle, a vehicle power interrupt feature being located in the vehicle and further being operably coupled to the vehicle center console transmission gear shift knob, an automatic transmission shift interlock solenoid switch being located in the vehicle and further being operably coupled to the vehicle center console transmission gear shift knob and the vehicle power interrupt feature, a controller being located in the vehicle and further being operably coupled to the first stealthy user interface, a brake pedal of the vehicle, and the vehicle power interrupt feature. Such a controller is configured to manage an operating mode of the vehicle center console transmission gear shift knob. Notably, upon receiving a first stealthy user input, the first stealthy user interface is configured to generate and transmit a gear shift deactivation signal to the controller. In this manner, upon receiving the gear shift deactivation signal, the controller is configured to generate and transmit a power interrupt signal to the vehicle power interrupt feature and thereby prohibit power from reaching the automatic transmission shift interlock solenoid switch. Advantageously, the vehicle center console transmission gear shift knob is prohibited from being displaced out of a park position while power is prohibited from reaching the automatic transmission shift interlock solenoid switch.

In a non-limiting exemplary embodiment, the system further includes a stealthy second user interface being stealthily positioned within the vehicle and spaced from the first stealthy user interface.

In a non-limiting exemplary embodiment, upon receiving a second stealthy user input, the stealthy second user interface being configured to generate and transmit a gear shift activation signal to the controller.

In a non-limiting exemplary embodiment, upon receiving the gear shift activation signal, the controller further being configured to generate and transmit a power enable signal to the vehicle power interrupt feature and thereby allow power to reach the automatic transmission shift interlock solenoid switch. Advantageously, the vehicle center console transmission gear shift knob is permitted to being displaced out of the park position while power is supplied to the automatic transmission shift interlock solenoid switch and while the vehicle brake pedal is depressed.

In a non-limiting exemplary embodiment, the first stealthy user interface is a foot-activated switch located adjacent to the vehicle brake pedal and out of the line of sight of the vehicle driver.

In a non-limiting exemplary embodiment, the second stealthy user interface is a portable key fob located within the vehicle and out of the line of sight of the vehicle driver.

In a non-limiting exemplary embodiment, the system further includes a third stealthy user interface including a stationary key switch located within the vehicle and out of the line of sight of the vehicle driver.

In a non-limiting exemplary embodiment, each of the first stealthy user interface and the stealthy second user interface is a software application executed on a remotely located peripheral electronic device located exterior of the vehicle.

In a non-limiting exemplary embodiment, the stealthy transmission shift interlock solenoid kill switch system may be remote controlled and/or directly hardwired to a controller configured to operably toggle, on and off, a power supply source to a transmission shift interlock switch and/or its associated control module regardless of whether the brake pedal is depressed when trying to shift out of the park gear and so long as the vehicle engine is running. The present disclosure prohibits the automatic transmission center console gear shift knob from being shifted out of the park position. The shift interlock solenoid switch is a member of the shifter assembly in the center of the console, such a solenoid switch locks the gear shift knob in the park position until the brake pedal has been depressed and an authorized user interface transmits an activation signal to the controller. In response, the controller toggles a power switch to an on position for delivering power to the solenoid switch. Once the solenoid switch receives power, it is operable and enables the gear shift knob to be displaced from the park position so long as the brake pedal is depressed.

In a non-limiting exemplary embodiment, the shift interlock solenoid switch converts electrical energy into mechanical motion, and may contain an electromagnet that moves a metal plunger. The electromagnet in the solenoid switch pulls the plunger in when powered on. For example, as current passes through the coil wire, a magnetic field occurs that pulls the iron plunger in, allowing the gear shift knob to be shifted out of the park position.

In a non-limiting exemplary embodiment, the controller powers the shift interlock solenoid switch only after the brake pedal has been depressed and an authorized activation signal is received at the controller. The activation signal delivers power to the solenoid switch and thus permits a user to shift the vehicle's transmission out of the park position so long as the brake pedal is pushed.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational and are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The non-limiting exemplary embodiment(s) is/are referred to generally in FIGS. 1-10 and is/are intended to provide a specially configured stealthy transmission shift interlock solenoid kill switch system 10 for selectively prohibiting an unauthorized user from displacing a center console transmission gear shift knob 11 from a park position to another gear position (e.g., neutral, drive, reverse) after the vehicle engine is started and running. It should be understood that the exemplary embodiment(s) may be used to disable the center console transmission gear shift knob 11 from the park position for a variety of automatic transmission vehicles having a central console gear shift knob 11, and should not be limited to any particular automatic transmission vehicle having a central console gear shift knob 11 described herein.

Referring to the FIGS. 1-10 in general, in a non-limiting exemplary embodiment(s), a device, mechanism, or system 10 is remote controlled and/or directly hardwired to kill/disable power to a transmission shift lock solenoid switch 17 and/or its control module 30 (operably coupled to the vehicle transmission 35) regardless of the brake pedal 19 being depressed, and thereby prohibits the center console transmission gear shift knob 11 to be shifted out of the park position while the engine is running. The present disclosure prohibits the vehicle 15 from being driven because it disables the transmission shift mechanism employed for changing the vehicle gears out of a park position.

Referring to FIGS. 1-10 in general, a stealthy transmission shift interlock solenoid kill switch system 10 includes a first stealthy user interface 12 being located within the vehicle 15 and further being configured to be stealthy and hidden from a vehicle driver's line of sight while sitting in the driver seat, (e.g., foot-activated interface near a parking brake foot pedal, or another position that is not obvious to an unauthorized vehicle user, etc.), a vehicle center console transmission gear shift knob 11 being located in the vehicle 15 and further being configured to operate an automatic transmission gear position of the vehicle 15, a vehicle power interrupt feature 16 (e.g., mechanical and/or electrical toggle switch or any component capable of interrupting power flow) being located in the vehicle 15 and further being operably coupled to the vehicle center sole transmission gear shift knob 11, an automatic transmission shift interlock solenoid switch 17 being located in the vehicle 15 and further being operably coupled to the vehicle center console transmission gear shift knob 11 and the vehicle power interrupt feature 16, a controller 18 being located in the vehicle 15 and further being operably coupled to the first stealthy user interface 12, a brake pedal 19 of the vehicle 15, and the vehicle power interrupt feature 16. Such a controller 18 is configured to manage an operating mode (transmission gear position) of the vehicle center console transmission gear shift knob 11. Notably, upon receiving a first stealthy user input (e.g., pressing a foot-activated pedal), the first stealthy user interface 12 is configured to generate and transmit a gear shift deactivation (or activation) signal to the controller 18. In this manner, upon receiving the gear shift deactivation signal, the controller 18 is configured to generate and transmit a power interrupt signal to the vehicle power interrupt feature 16 and thereby prohibit power from reaching the automatic transmission shift interlock solenoid switch 17. Advantageously and as a result, the vehicle center console transmission gear shift knob 11 is prohibited from being displaced out of a park position (while the vehicle engine is running) because power is prohibited from reaching the automatic transmission shift interlock solenoid switch 17. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

Figure 9:
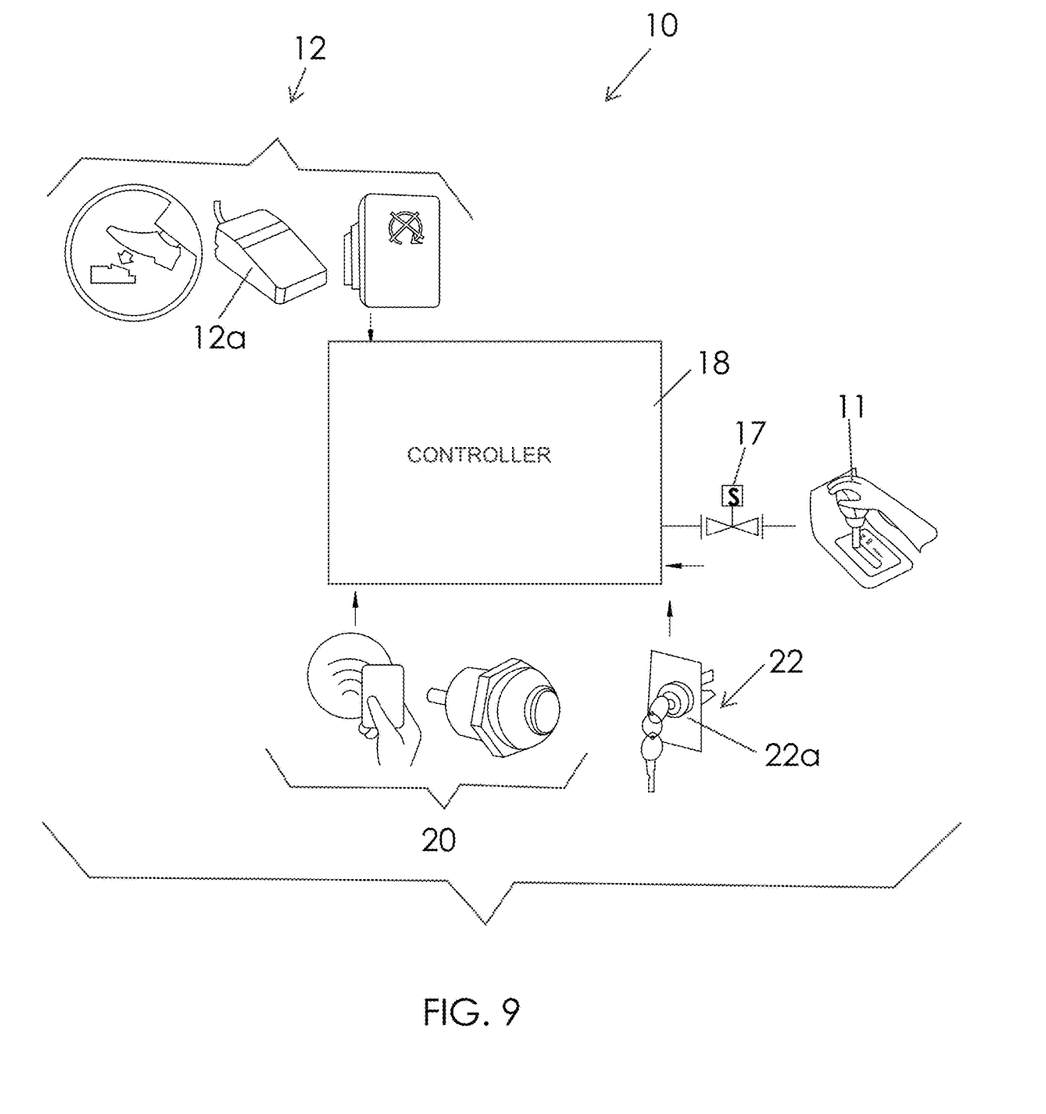
FIG. 9 is another high-level schematic diagram showing the interrelationship between some of the major electrical components (e.g., multiple user interfaces) of the stealthy transmission shift interlock solenoid kill switch system, in accordance with a non-limiting exemplary embodiment of the present disclosure.
Figure 10:
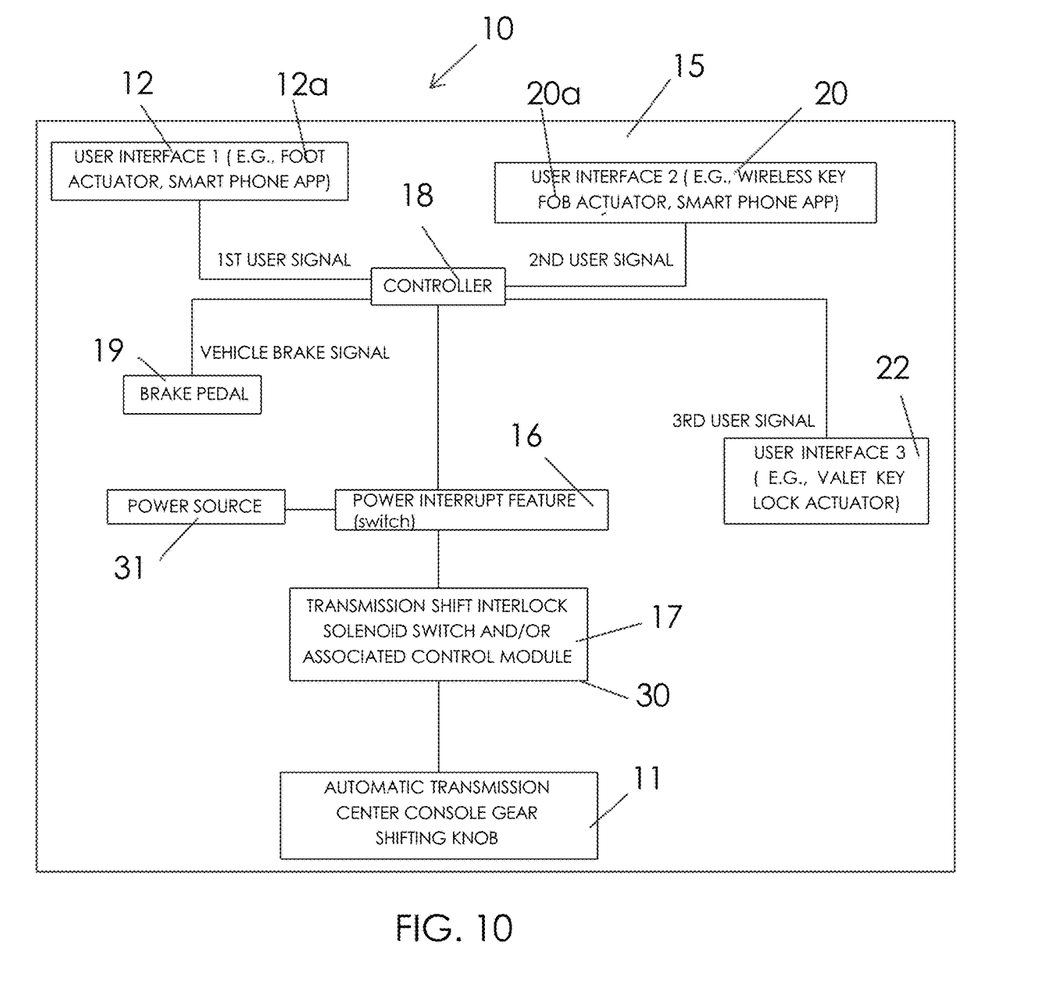
FIG. 10 is a high-level schematic block diagram showing the interrelationship between some of the major electrical components (e.g., multiple user interfaces) of the stealthy transmission shift interlock solenoid kill switch system, in accordance with a non-limiting exemplary embodiment of the present disclosure.

In a non-limiting exemplary embodiment, the system 10 further includes a stealthy second user interface 20 (e.g., wireless key fob actuator, smartphone app, etc.) being stealthily positioned within the vehicle 15 and spaced from the first stealthy user interface 12. Such a stealthy second user interface 20 can be used to also deactivate the system 10 if the driver is not seated in the driver seat to reach the foot-activation/foot-deactivation pedal near the brake pedal (first user interface 12 is initially pressed to activate the system 10 and then pressed again to deactivate the system 12). Thus, system 10 can be activated by the first user interface 12 and deactivated via the key fob 20, as an option. Such a structural configuration yields the new, useful, and unpredicted result of prohibiting an authorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

In a non-limiting exemplary embodiment, upon receiving a second stealthy user input, the stealthy second user interface 20 is configured to generate and transmit a gear shift activation (or deactivation) signal to the controller 18. Advantageously, if a thief orders the driver out of the vehicle 15 before the driver can activate the system 10 via the first user interface 12, the driver can quickly and inconspicuously scan the key fob 20 across an associated sensor in the vehicle 15 to activate the system 10 while exiting the vehicle 15. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

In a non-limiting exemplary embodiment, each of the first user interface 12 and the second user interface 20 can, independently and in combination, activate and deactivate the system 10. Controller 18 is configured to determine whether the gear shift signals are activation or deactivation signals by detecting an operating mode of the vehicle engine. For example, if the gear shift signal (from either the first user interface 12 or second user interface 20) is received while the system 10 is at an "inactive" state, the controller 18 processes the signal as a gear shift "activation" signal to activate (turn on) system 10. Conversely, if the gear shift signal (from either the first user interface 12 or second user interface 20) is received while the system 10 is at an "active" state, the controller 18 processes the signal as a gear shift "deactivation" signal, to deactivate (turn oft) system 10.

In a non-limiting exemplary embodiment, upon receiving the gear shift activation signal, the controller 18 further is configured to generate and transmit a power enable signal to the vehicle power interrupt feature 16 and thereby allow power to reach the automatic transmission shift interlock solenoid switch 17. Advantageously, the vehicle center console transmission gear shift knob 11 is permitted to being displaced out of the park position while power is supplied to the automatic transmission shift interlock solenoid switch 17 and while the vehicle brake pedal 19 is depressed. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

In a non-limiting exemplary embodiment, the first stealthy user interface 12 is a foot-activated switch 12*a* located adjacent to the vehicle brake pedal and out of the line of sight of the vehicle 15 driver. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

In a non-limiting exemplary embodiment, the second stealthy user interface 20 is a portable key fob 20*a* located within vehicle 15 and out of the line of sight of the vehicle 15 driver. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

In a non-limiting exemplary embodiment, the system 10 further includes a third stealthy user interface 22 including a stationary key switch 22*a* located within the vehicle 15 and out of the line of sight of the vehicle 15 driver. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

In a non-limiting exemplary embodiment, each of the first stealthy user interface 12 and the stealthy second user interface 20 is a software application executed on a remotely located peripheral electronic device located exterior of the vehicle 15. Thus, a remotely located authorized user or law enforcement personnel can remotely activate and deactivate system 10. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

Figure 8:
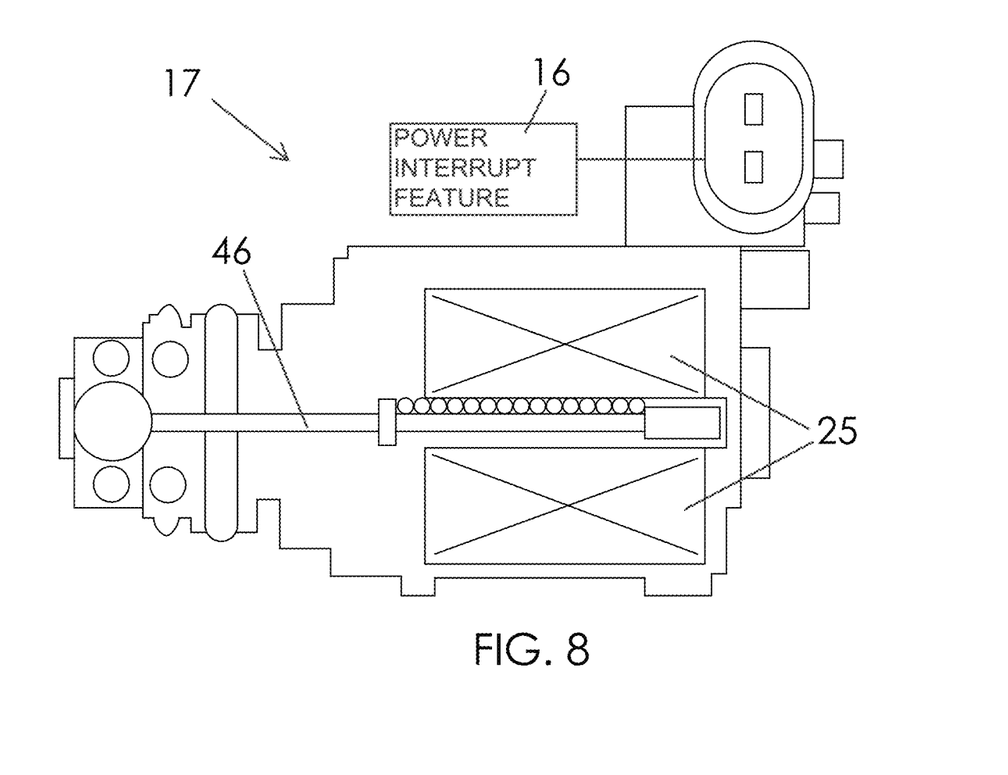
FIG. 8 is another cross-sectional view of the solenoid switch shown in FIG. 1 wherein the shift interlock control switch disables power to the solenoid switch, in accordance with a non-limiting exemplary embodiment of the present disclosure.

In a non-limiting exemplary embodiment, the stealthy transmission shift interlock solenoid kill switch system 10 may be remote controlled and/or directly hardwired to controller 18 configured to operably toggle (on and off) a power supply source 31 to the automatic transmission shift interlock solenoid switch 17 and/or its associated control module 30 regardless of whether the brake pedal 19 is depressed when trying to shift out of the park gear and so long as the vehicle 15 engine is running. The present disclosure prohibits the automatic transmission center console gear shift knob 11 from being shifted out of the park position, especially when the brake pedal is pressed while vehicle 15 engine is running. The shift interlock solenoid switch 17 is a member of the shifter assembly in the center of the console of vehicle 15. Such a solenoid switch 17 locks the gear shift knob 11 in the park position until the brake pedal 19 has been depressed and an authorized user interface 12, 20, 22 transmits an activation signal to the controller 18. In response, the controller 18 toggles the power interrupt feature 16 (switch) to an on (closed) position for delivering power to the solenoid switch 17. Once the solenoid switch 17 receives power, it is operable and enables the gear shift knob 11 to be displaced from the park position so long as the brake pedal 19 is depressed and the vehicle 15 engine is running. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

Figure 1:
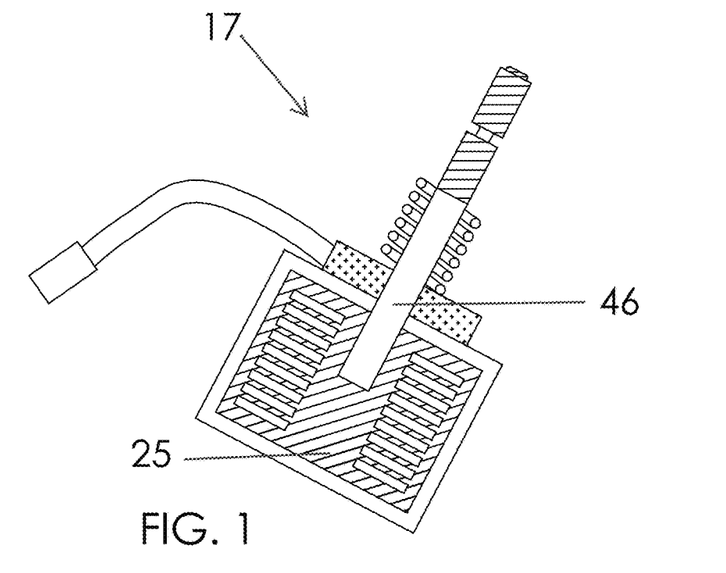
FIG. 1 is a cross-sectional view of a solenoid switch employed by the stealthy transmission shift interlock solenoid kill switch system, in accordance with a non-limiting exemplary embodiment of the present disclosure.
Figure 2:
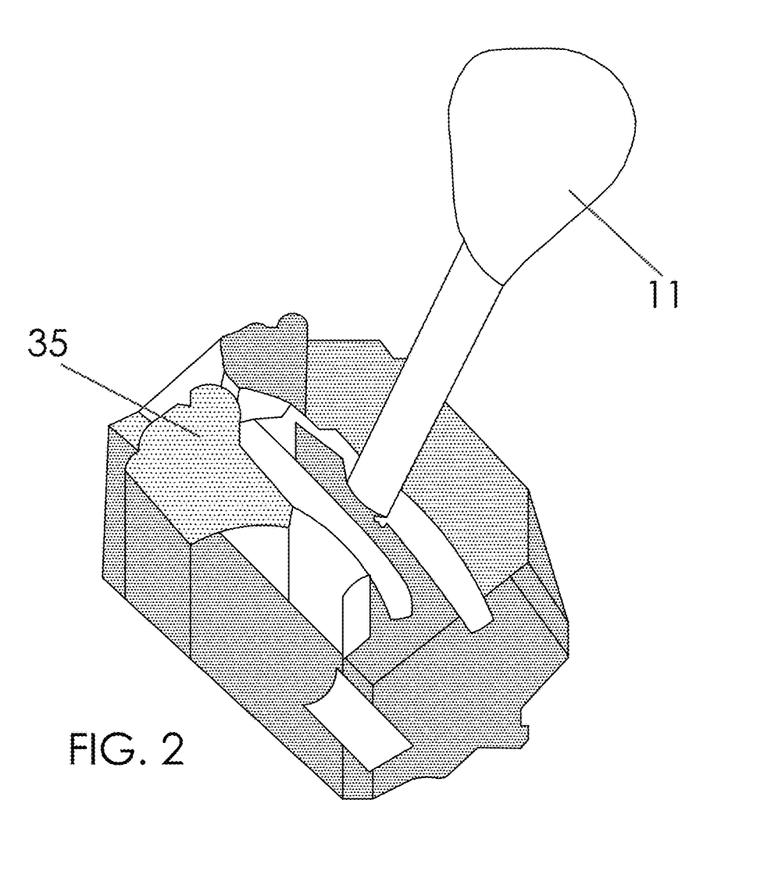
FIG. 2 is a perspective view of a vehicle center console transmission gear shift knob, in accordance with a non-limiting exemplary embodiment of the present disclosure.
Figure 3:
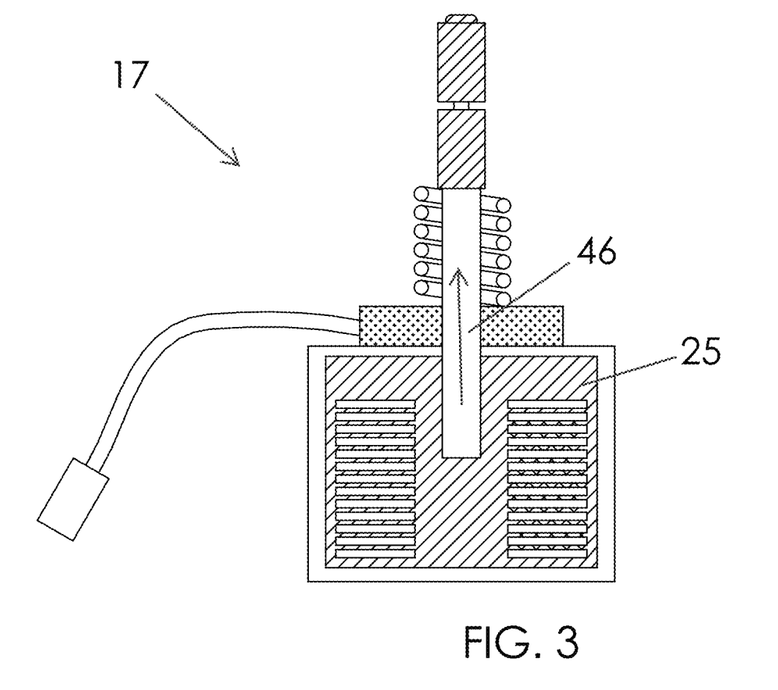
FIG. 3 is another cross-sectional view of the solenoid switch shown in FIG. 1, at a disengaged position, in accordance with a non-limiting exemplary embodiment of the present disclosure.
Figure 4:
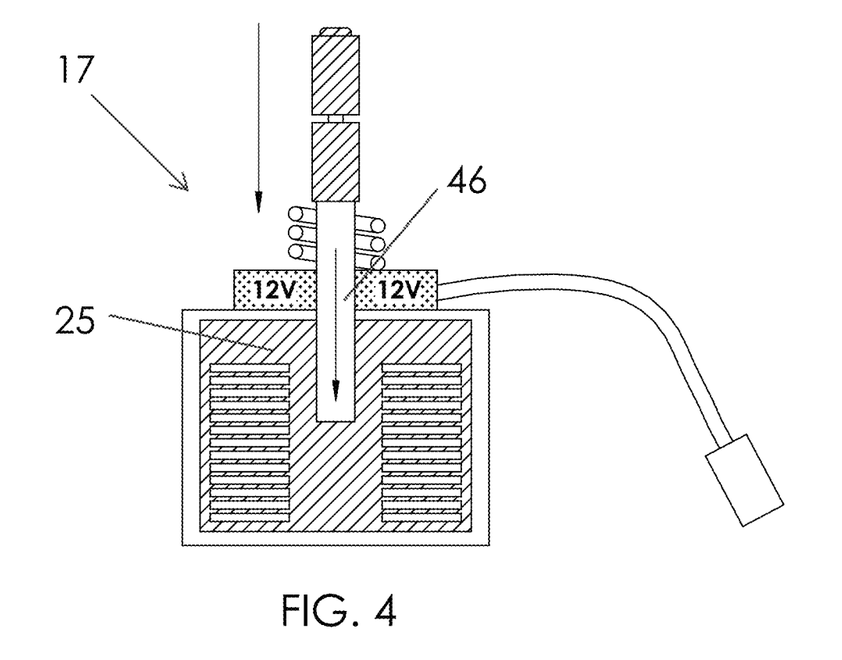
FIG. 4 is another cross-sectional view of the solenoid switch shown in FIG. 1, at an engaged position, in accordance with a non-limiting exemplary embodiment of the present disclosure.
Figure 5:
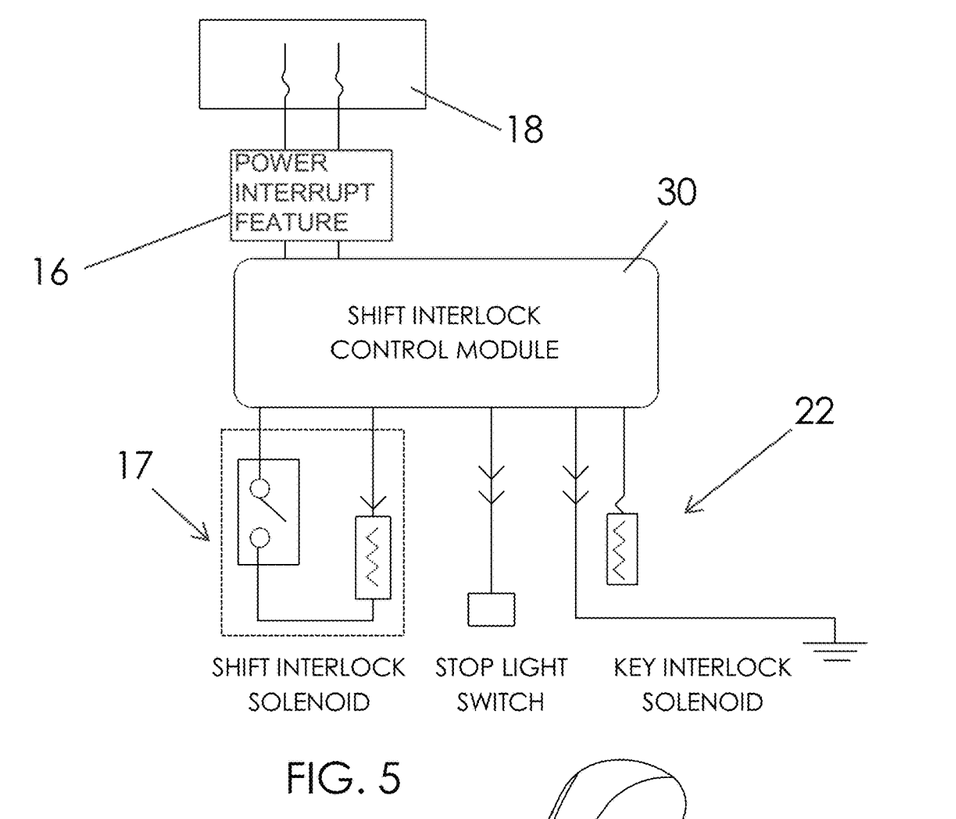
FIG. 5 is a high-level schematic diagram showing the interrelationship between some of the major electrical components of the stealthy transmission shift interlock solenoid kill switch system, in accordance with a non-limiting exemplary embodiment of the present disclosure.
Figure 6:
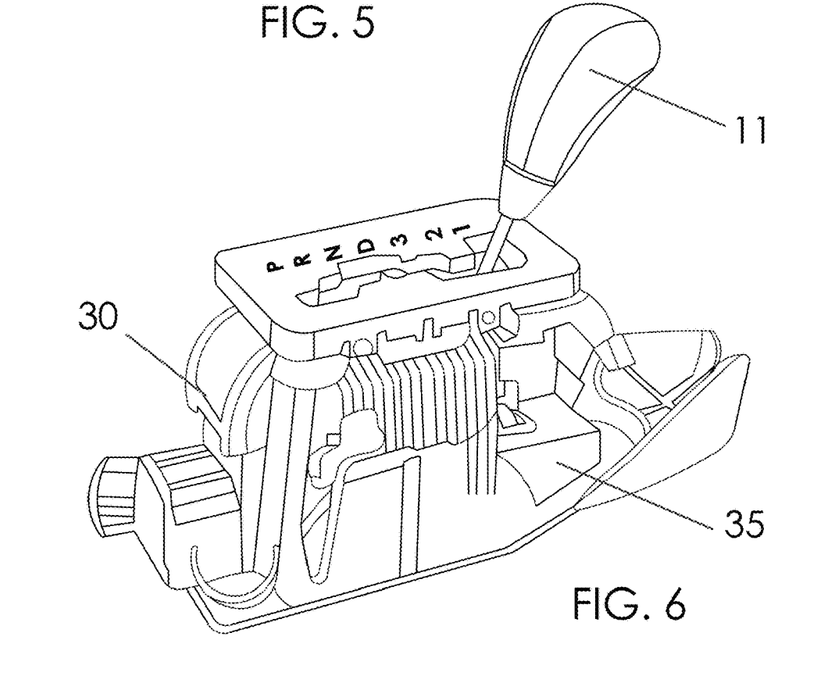
FIG. 6 is another perspective view of the vehicle center console transmission gear shift knob shown in FIG. 2, and being operably attached to a transmission controller of the vehicle, in accordance with a non-limiting exemplary embodiment of the present disclosure.
Figure 7:
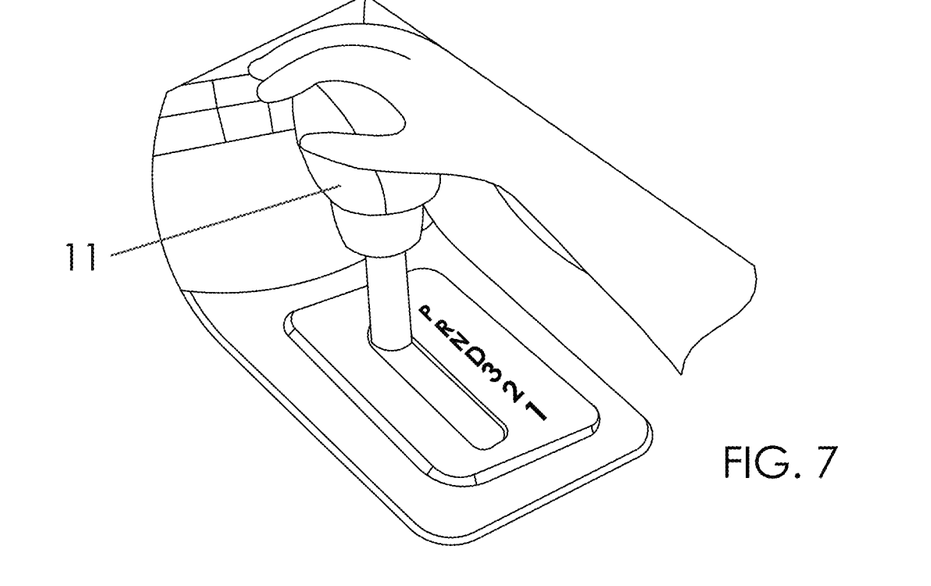
FIG. 7 is another perspective view of the vehicle center console transmission gear shift knob, in accordance with a non-limiting exemplary embodiment of the present disclosure.

In a non-limiting exemplary embodiment, the shift interlock solenoid switch 17 converts electrical energy into mechanical motion, and may contain an electromagnet 25 that moves a metal plunger 46. The electromagnet 25 in the solenoid switch pulls the plunger 46 in when powered on. For example, as current passes through the coil wire, a magnetic field occurs that pulls the iron plunger 46 in, allowing the gear shift knob 11 to be shifted out of the park position. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle 15 engine is operating (e.g., running, on, etc.).

In a non-limiting exemplary embodiment, the controller 18 powers the shift interlock solenoid switch 17 only after the brake pedal 19 has been depressed and an authorized activation signal is received at the controller 18, while the vehicle is running. The activation signal delivers power to the solenoid switch 17 and thus permits a user to shift the vehicle transmission shift knob 11 out of the park position so long as the brake pedal 19 is pushed and the vehicle 15 is running. Such a structural configuration yields the new, useful, and unpredicted result of prohibiting an unauthorized user from stealing the vehicle 15 while the vehicle engine is running because the center console transmission gear shift knob 11 cannot be shifted out of park. For example, the vehicle driver can exit the running vehicle 15 and leave it unattended without having to worry about the vehicle 15 being stolen, while the vehicle engine is operating (e.g., running, on, etc.).

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A stealthy transmission shift interlock solenoid kill switch system, said stealthy transmission shift interlock solenoid kill switch system comprising:
   a first stealthy user interface being located within a vehicle and further being configured to be stealthy and hidden from a vehicle driver's line of sight;
   a vehicle center console transmission gear shift knob located in the vehicle and being configured to operate an automatic transmission gear position of the vehicle;
   a vehicle power interrupt feature being operably coupled to said vehicle center console transmission gear shift knob;
   an automatic transmission shift interlock solenoid switch being operably coupled to said vehicle center console transmission gear shift knob and said vehicle power interrupt feature;
   a controller being operably coupled to said first stealthy user interface, a brake pedal of the vehicle, and said vehicle power interrupt feature, said controller further being configured to manage an operating mode of said vehicle center console transmission gear shift knob;
   upon receiving a first stealthy user input, said first stealthy user interface being configured to generate and transmit a gear shift deactivation signal to said controller;
   upon receiving said gear shift deactivation signal, said controller being configured to generate and transmit a power interrupt signal to said vehicle power interrupt feature and thereby prohibit power from reaching said automatic transmission shift interlock solenoid switch;
   wherein said vehicle center console transmission gear shift knob is configured to be prohibited from being displaced out of a park position while power is prohibited from reaching said automatic transmission shift interlock solenoid switch.

2. The stealthy transmission shift interlock solenoid kill switch system of claim 1, further comprising: a stealthy second user interface being stealthily positioned within the vehicle and spaced from said first stealthy user interface.

3. The stealthy transmission shift interlock solenoid kill switch system of claim 2, upon receiving a second stealthy user input, said stealthy second user interface being configured to generate and transmit a gear shift activation signal to said controller.

4. The stealthy transmission shift interlock solenoid kill switch system of claim 3, upon receiving said gear shift activation signal, said controller further being configured to generate and transmit a power enable signal to said vehicle power interrupt feature and thereby allow power to reach said automatic transmission shift interlock solenoid switch;
   wherein said vehicle center console transmission gear shift knob is permitted to being displaced out of the park position while power is supplied to said automatic transmission shift interlock solenoid switch and while the vehicle brake pedal is depressed.

5. The stealthy transmission shift interlock solenoid kill switch system of claim 4, wherein said first stealthy user interface is a foot-activated switch located adjacent to the vehicle brake pedal and out of the line of sight of the vehicle driver.

6. The stealthy transmission shift interlock solenoid kill switch system of claim 4, wherein said stealthy second user interface is a portable key fob located within the vehicle and out of the line of sight of the vehicle driver.

7. The stealthy transmission shift interlock solenoid kill switch system of claim 4, further comprising: a third stealthy user interface including a stationary key switch located within the vehicle and out of the line of sight of the vehicle driver.

8. A stealthy transmission shift interlock solenoid kill switch system, said stealthy transmission shift interlock solenoid kill switch system comprising:
   a first stealthy user interface being located within a vehicle and further being configured to be stealthy and hidden from a vehicle driver's line of sight;
   a vehicle center console transmission gear shift knob being located in the vehicle and further being configured to operate an automatic transmission gear position of the vehicle;
   a vehicle power interrupt feature being located in the vehicle and further being operably coupled to said vehicle center console transmission gear shift knob;
   an automatic transmission shift interlock solenoid switch being located in the vehicle and further being operably coupled to said vehicle center console transmission gear shift knob and said vehicle power interrupt feature;
   a controller being located in the vehicle and further being operably coupled to said first stealthy user interface, a brake pedal of the vehicle, and said vehicle power interrupt feature, said controller further being configured to manage an operating mode of said vehicle center console transmission gear shift knob;
   upon receiving a first stealthy user input, said first stealthy user interface being configured to generate and transmit a gear shift deactivation signal to said controller;
   upon receiving said gear shift deactivation signal, said controller being configured to generate and transmit a power interrupt signal to said vehicle power interrupt feature and thereby prohibit power from reaching said automatic transmission shift interlock solenoid switch;
   wherein said vehicle center console transmission gear shift knob is configured to be prohibited from being displaced out of a park position while power is prohibited from reaching said automatic transmission shift interlock solenoid switch.

9. The stealthy transmission shift interlock solenoid kill switch system of claim 8, further comprising: a stealthy second user interface being stealthily positioned within the vehicle and spaced from said first stealthy user interface.

10. The stealthy transmission shift interlock solenoid kill switch system of claim 9, upon receiving a second stealthy user input, said stealthy second user interface being configured to generate and transmit a gear shift activation signal to said controller.

11. The stealthy transmission shift interlock solenoid kill switch system of claim 10, upon receiving said gear shift activation signal, said controller further being configured to generate and transmit a power enable signal to said vehicle power interrupt feature and thereby allow power to reach said automatic transmission shift interlock solenoid switch;
   wherein said vehicle center console transmission gear shift knob is permitted to being displaced out of the park position while power is supplied to said automatic transmission shift interlock solenoid switch and while the vehicle brake pedal is depressed.

12. The stealthy transmission shift interlock solenoid kill switch system of claim 11, wherein said first stealthy user interface is a foot-activated switch located adjacent to the vehicle brake pedal and out of the line of sight of the vehicle driver.

13. The stealthy transmission shift interlock solenoid kill switch system of claim 11, wherein said stealthy second user interface is a portable key fob located within the vehicle and out of the line of sight of the vehicle driver.

14. The stealthy transmission shift interlock solenoid kill switch system of claim 11, further comprising: a third stealthy user interface including a stationary key switch located within the vehicle and out of the line of sight of the vehicle driver.

\* \* \* \* \*